(12) United States Patent
Rains

(10) Patent No.: US 7,685,970 B1
(45) Date of Patent: Mar. 30, 2010

(54) AERIAL CAPTURE-AND-CARRY OF CATTLE BY LAND VEHICLE, AND APPARATUS

(76) Inventor: Clayton D. Rains, 9010 S. 1101 Rd., Stockton, MO (US) 65785

( * ) Notice: Subject to any disclaimer, the term of this patent is extended or adjusted under 35 U.S.C. 154(b) by 184 days.

(21) Appl. No.: 12/150,443

(22) Filed: Apr. 28, 2008

Related U.S. Application Data

(63) Continuation of application No. 12/012,519, filed on Feb. 1, 2008, now abandoned.

(60) Provisional application No. 60/898,786, filed on Feb. 1, 2007.

(51) Int. Cl.
*A01K 15/04* (2006.01)

(52) U.S. Cl. .................. 119/512; 119/519; 119/732

(58) Field of Classification Search .......... 119/512, 119/519, 751, 752, 753, 756, 400, 406, 407, 119/712, 732, 728, 453
See application file for complete search history.

(56) References Cited

U.S. PATENT DOCUMENTS

| | | | | |
|---|---|---|---|---|
| 3,095,858 A | | 7/1963 | Bauer | 119/744 |
| 3,726,256 A | * | 4/1973 | Bernhardt et al. | 119/512 |
| 3,931,796 A | | 1/1976 | Hoffman | 119/801 |
| 4,590,887 A | * | 5/1986 | Holopainen | 119/723 |
| 5,138,981 A | | 8/1992 | Akins | 119/732 |
| 5,186,125 A | | 2/1993 | Halyung | 119/712 |
| 5,289,801 A | * | 3/1994 | Burks | 119/728 |
| 5,372,092 A | | 12/1994 | Pederson | 119/510 |
| 5,785,006 A | * | 7/1998 | Prentice | 119/732 |
| 6,035,808 A | | 3/2000 | Herman | 119/732 |
| 6,964,245 B2 | | 11/2005 | Beck | 119/512 |
| 7,287,490 B2 | * | 10/2007 | Kurt | 119/712 |
| 7,389,746 B2 | * | 6/2008 | Byl et al. | 119/512 |

* cited by examiner

*Primary Examiner*—Yvonne R. Abbott
(74) *Attorney, Agent, or Firm*—Jonathan A. Bay

(57) ABSTRACT

An aerial pen raised and lowered by a driven land vehicle has sidewalls defining an open bottom, a retractable platform for a targeted animal to stand on, a livestock head gate, and a retractable crowding gate cooperatively arranged with the deployed platform and head gate for securing the targeted animal for aerial carrying. Use of the aerial pen is like practicing, on a large-scale, a box-trap style 'pursuit-and-pounce' of cattle catching, albeit at an unhurried pace of pursuit, followed by an unhurried pounce. The box-trap style capture might be likened to the activity of 'pouncing' or, more fancifully, likened to the activity of netting as practiced by insect collectors with aerial nets (eg., butterfly nets). Presumptively, the livestock animal is sick or otherwise slowed, which permits this activity to be practiced without harm to the animal.

15 Claims, 8 Drawing Sheets

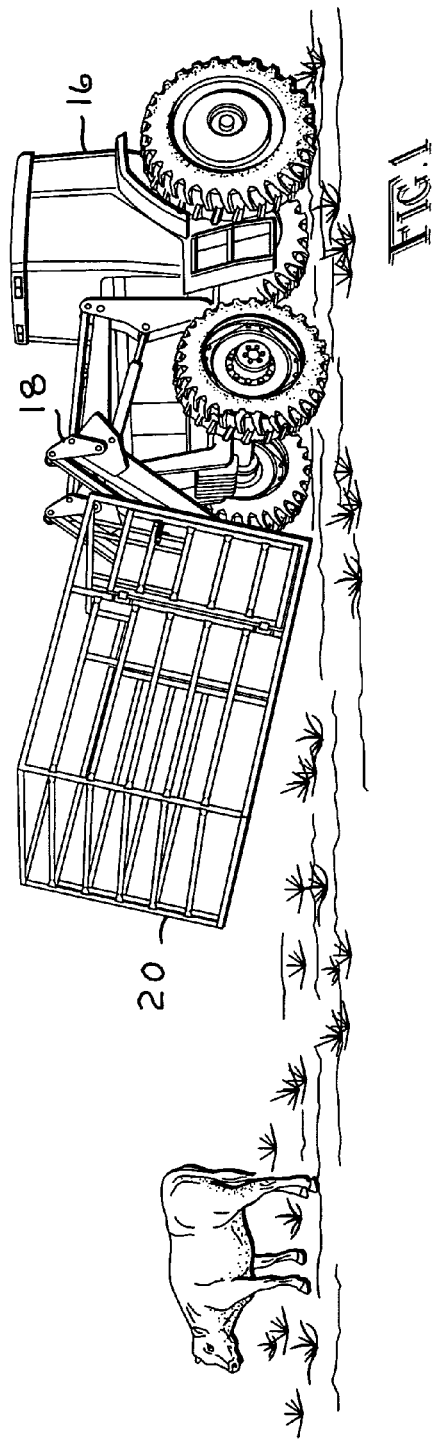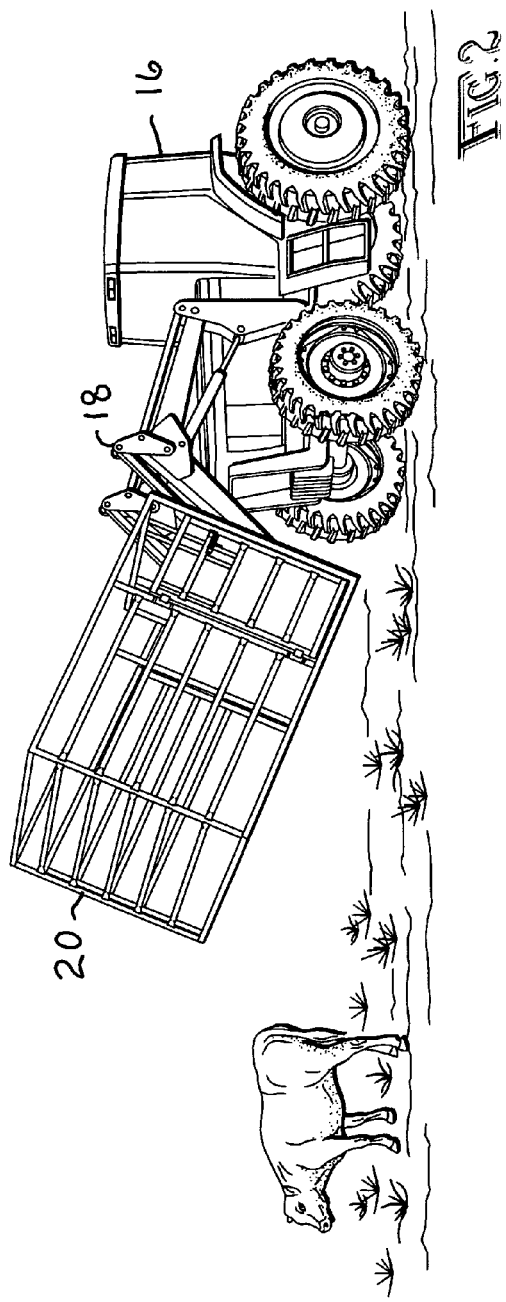

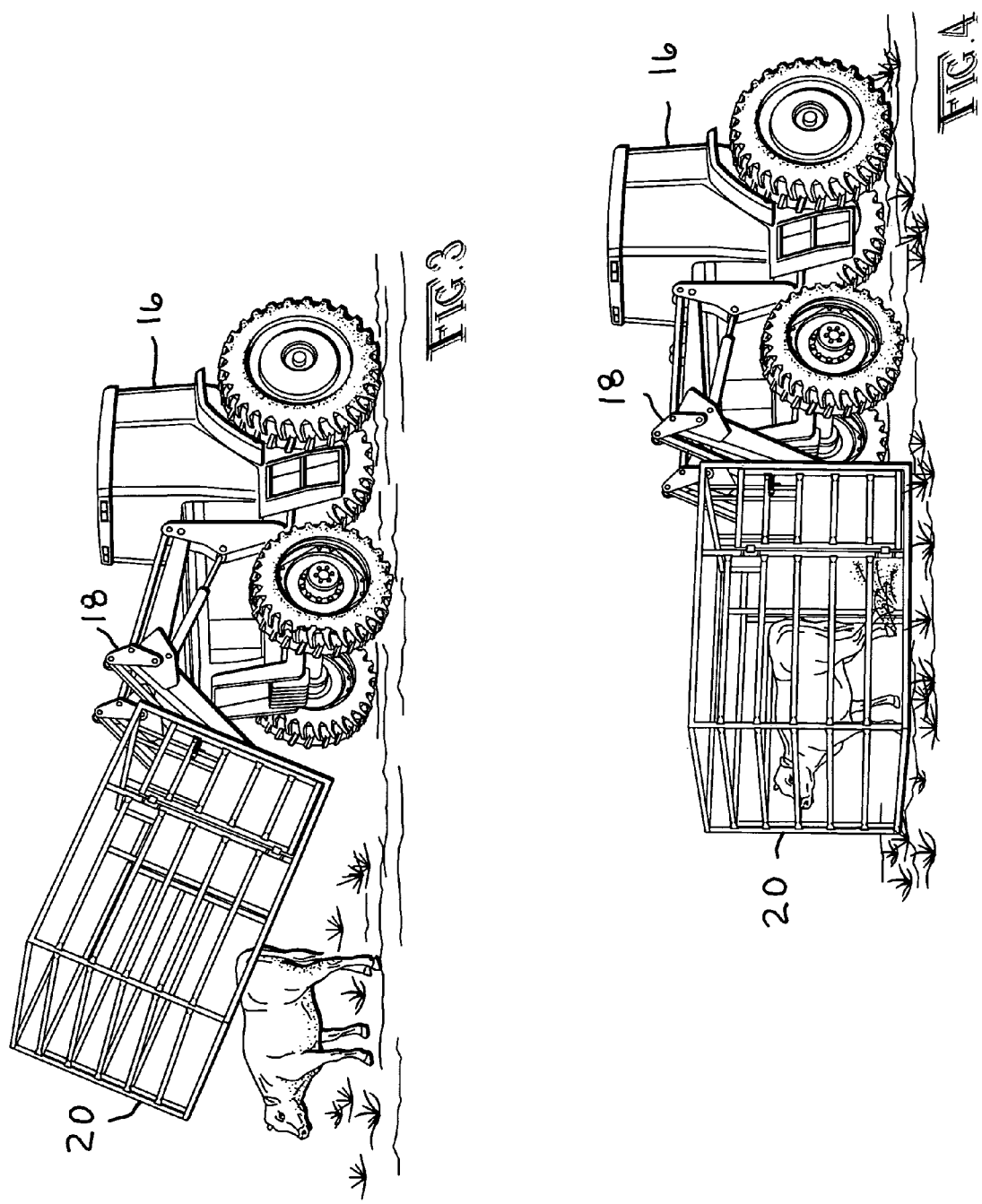

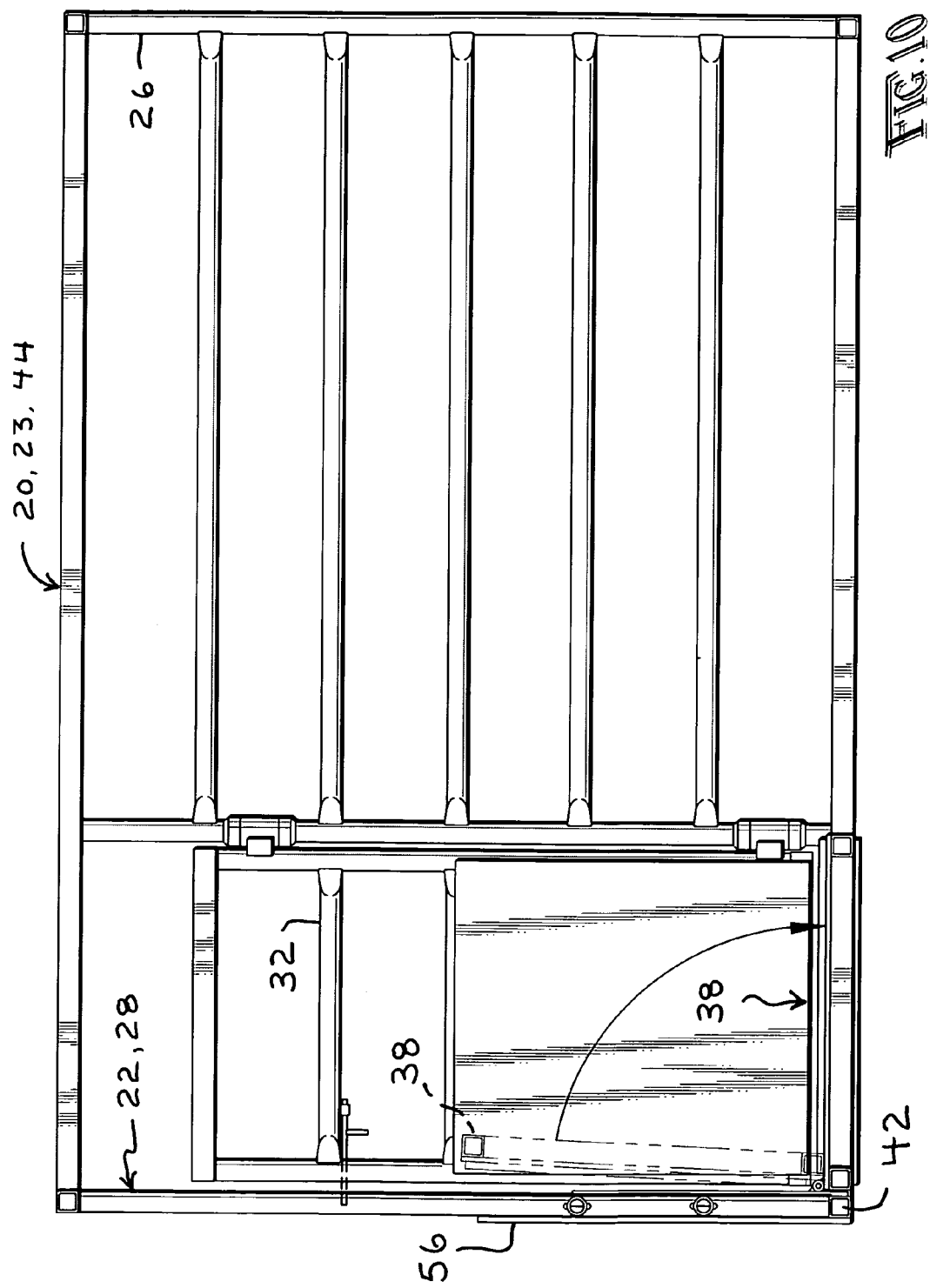

US 7,685,970 B1

AERIAL CAPTURE-AND-CARRY OF CATTLE BY LAND VEHICLE, AND APPARATUS

CROSS-REFERENCE TO RELATED APPLICATION(S)

This application is a continuation of U.S. patent application Ser. No. 12/012,519, filed Feb. 1, 2008 now abandoned; which claims the benefit of U.S. Provisional Application No. 60/898,786, filed Feb. 1, 2007; the disclosures of which are incorporated herein by this reference thereto.

BACKGROUND AND SUMMARY OF THE INVENTION

The invention relates to livestock controlling or handling. In more particular technical terms, the invention relates a combination of a head stock (eg., head gate) and crate (eg., chute) for which the crate has a movable clamping side. Additionally, the invention relates to a holding crate or trap having adjustable animal positioning or accommodating means.

Technical terms aside, the invention might be more fancifully reckoned as a method on a large-scale of box-trap style, 'pursuit-and-pounce' cattle catching:—albeit by an unhurried pursuit followed by an unhurried pounce. The box-trap style capture fancifully described as 'pouncing' might be furthermore fancifully likened to the activity of netting as practiced by insect collectors with aerial nets (eg., butterfly nets).

It is an aspect of the invention to empower a driver of a land vehicle with capabilities for practicing such a 'pursuit-and-pounce' method of cattle catching.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIGS. 1 through 8 comprise a sequence of perspective views depicting not only a method but also apparatus in accordance with the invention for aerial capture-and-carry of cattle in open terrain by land vehicle, wherein:—

FIG. 1 is a perspective view apparatus in accordance with the invention for aerial capture-and-carry of cattle in open terrain by land vehicle, wherein a tractor with a front-end loader arrangement is carrying aloft an aerial pen/hauler in accordance with the invention;

FIG. 2 is a perspective view comparable to FIG. 1 except showing further progress in the action;

FIG. 3 is a perspective view comparable to FIG. 2 except showing further progress in the action;

FIG. 4 is a perspective view comparable to FIG. 3 except showing further progress in the action;

FIG. 10 is a section view taken along line X-X in FIG. 9.

DETAILED DESCRIPTION OF THE PREFERRED EMBODIMENTS

As said, FIGS. 1 through 8 comprise a sequence of frames showing the carrying-out of a method in accordance with the invention for aerial capture-and-carry of cattle in open terrain by land vehicle.

Pause can be taken to briefly describe the apparatus which are preferred to be put to service in practicing the invention. Basically, the preferred apparatus comprises a tractor 16 with a front-end loader attachment 18 in combination with an inventive aerial pen/hauler 20.

Figure 8:
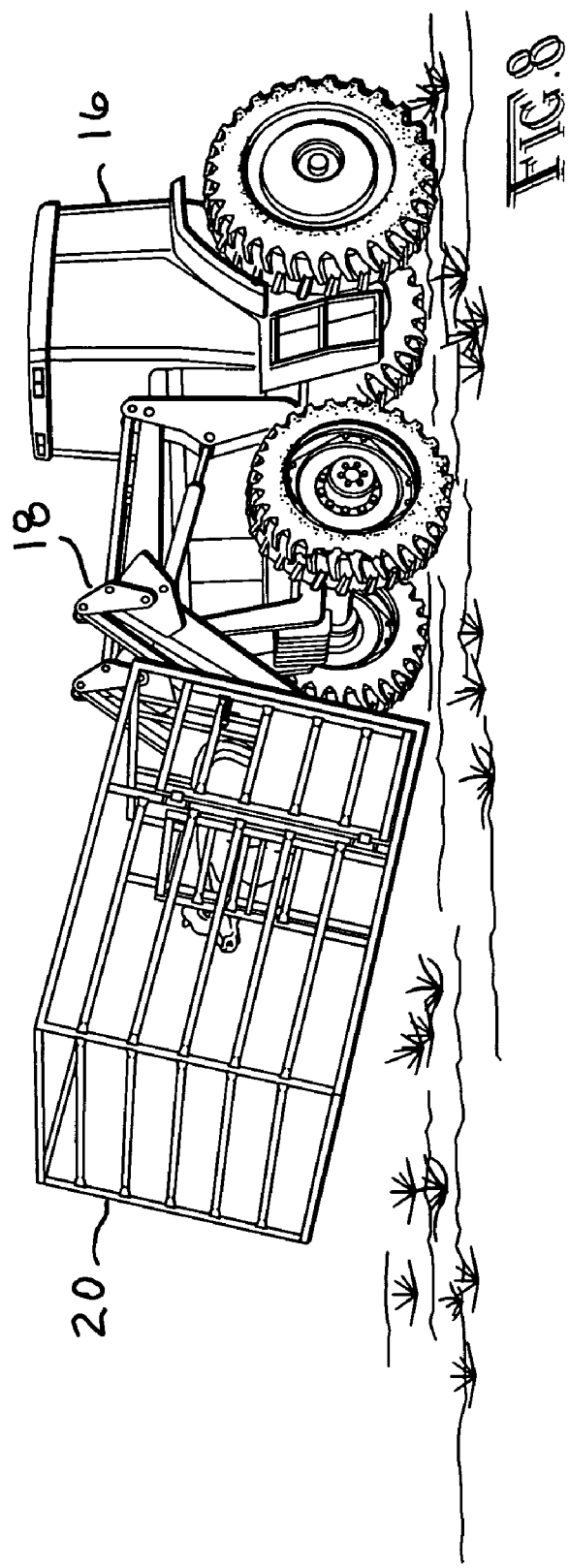
FIG. 8 is a perspective view comparable to FIG. 1 except showing the aerial pen/hauler in accordance with the invention being carried aloft, with the captured cow in transit.

As mentioned previously, it is an aspect of the invention to give a driver of a land vehicle the capability to practice the 'pursuit-and-pounce' method of cattle catching in accordance with the invention. The preferred land vehicle to put in service for practicing the invention includes without limitation a tractor 16 with a front-end loader attachment 18. The reason for this preference includes that, farms and ranches or other operations likely to have cattle to care for are almost surely going to have a tractor 16 readily available on the premises or within easy reach. Moreover, nowadays a front-end loader attachment 18 is likewise a commonplace accessory on farms and ranches and like operations likely to have cattle to care for. Accordingly, FIGS. 1-5 as well as FIG. 8 show a tractor 16 with a front-end loader attachment 18 put to service in practicing the invention.

It is preferred if the hydraulics of the tractor/front-end loader attachment 16 and 18 are custom modified for a little bit faster operation than the speed provided by the factory, and for the reasons described more particularly below.

Figure 9:
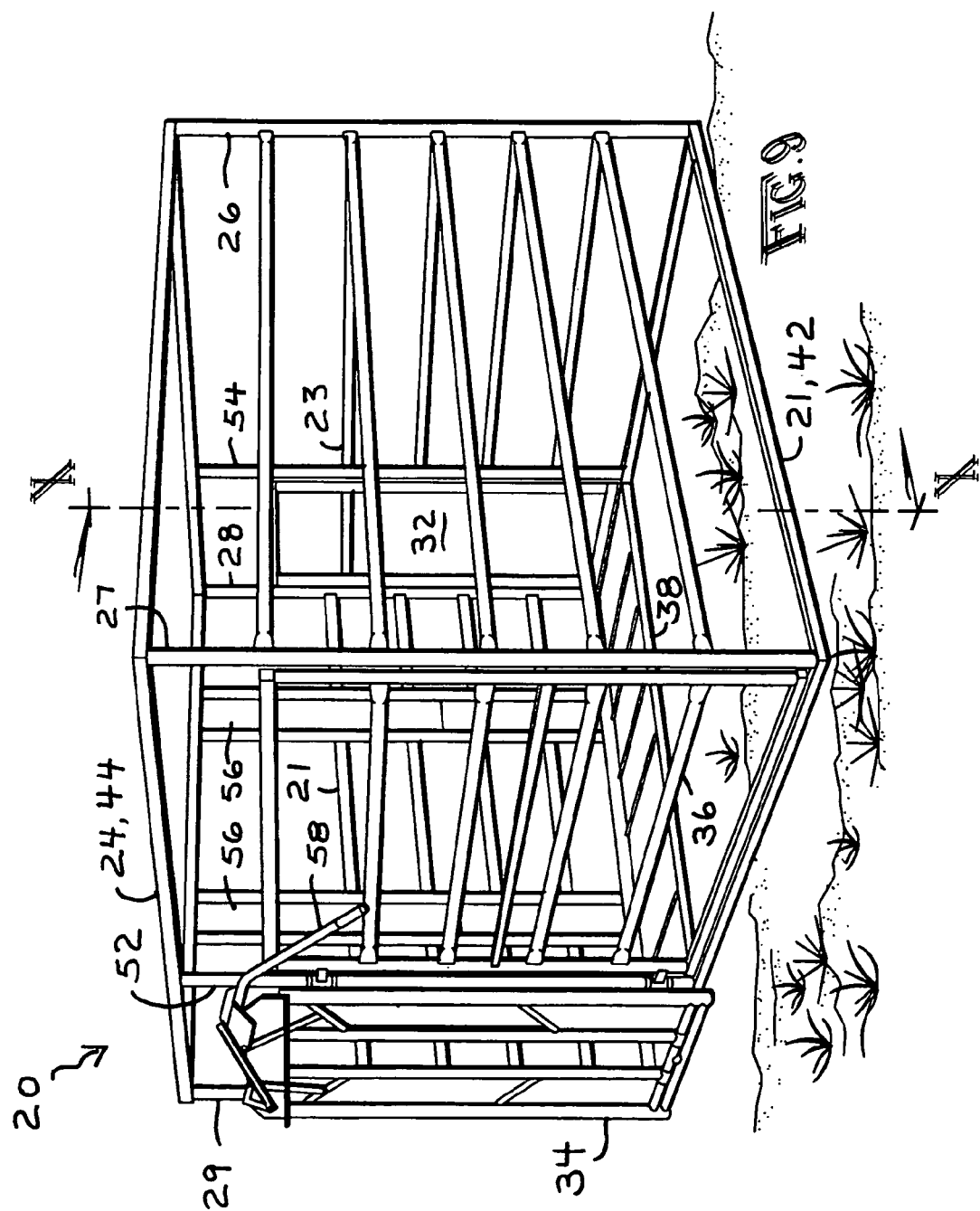
FIG. 9 is a perspective view comparable to FIG. 6.

To turn ahead to FIGS. 9 and 10, they show better some of the inventive constructional aspects of the aerial pen/hauler 20 in accordance with the invention. The aerial pen/hauler 20 comprises four (4) frame panels 21-24 joined at four (4) corner posts 26-29 to form a square (or rectangular) pen that has an open-top and substantially open bottom.

The four (4) frame panels 21-24 comprise the following. That is, there is a front frame panel 21 of vertically-spaced bars in a grill pattern, a rear frame panel 22, and a pair of side frame panels 23 and 24 which are not as altogether rigid as the front or rear panels 21 and 22. One side panel 23 (eg., the left-side's panel) includes a swinging walk-in gate 32 along the corner 28 with the rear panel 22. The walk-in gate 32 is solid for its lower half (or so) but then a grill of vertically-spaced bars for its remaining upper portions.

Figure 7:
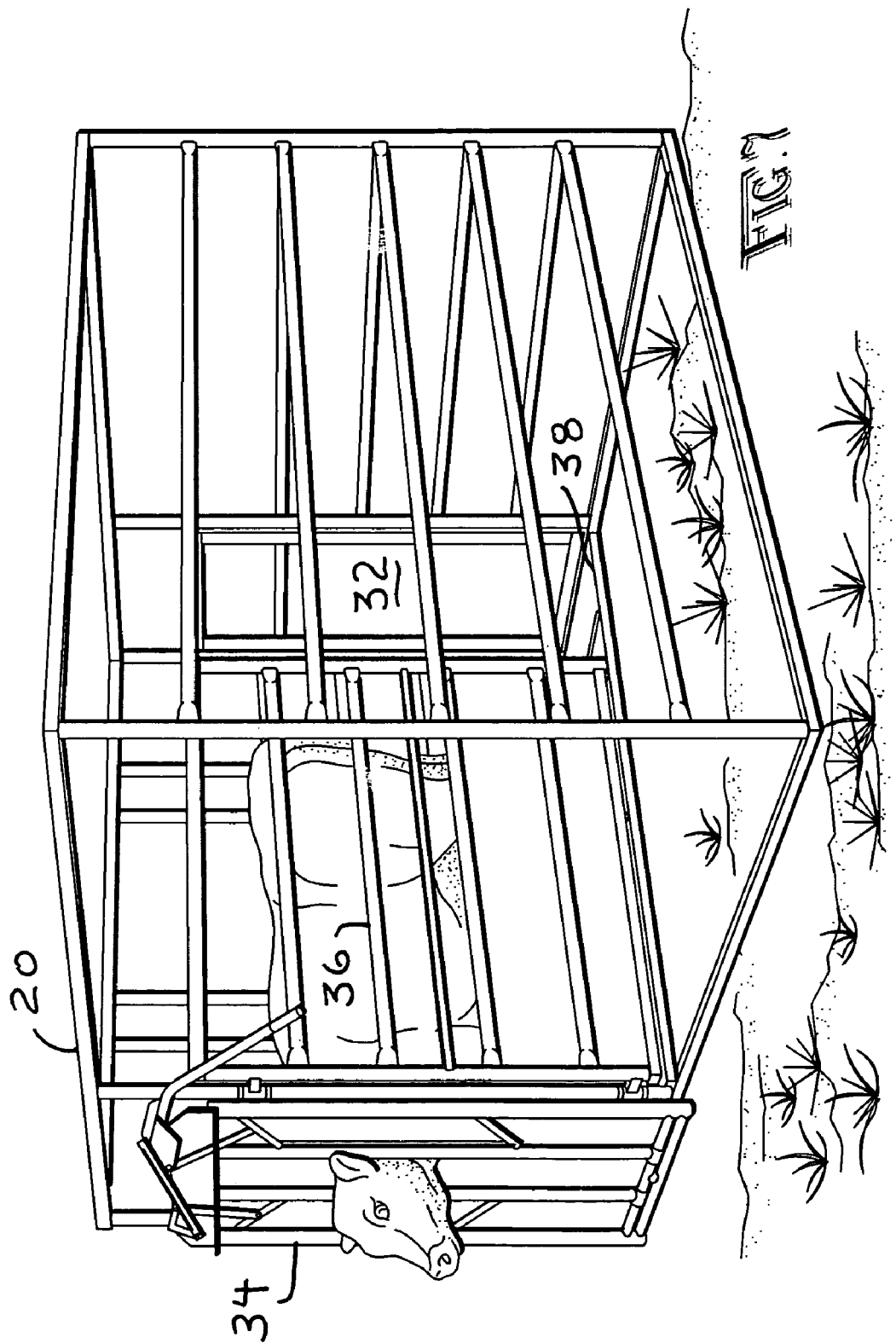
FIG. 7 is a perspective view comparable to FIG. 6 except showing the crowding gate swung into its "crowding position.

The other side panel 24 (eg., the right-side's panel) is an assembly comprising not only a head gate 34 (see, eg, FIG. 9) that is disposed along the corner 29 with rear panel 22 but also a swinging crowding gate 36 (and shown swung to a "crowding position" in FIG. 7). The crowding gate 36 constitutes the remainder of the right-side panel 24 of what is leftover by the head gate 34. The crowding gate 36 is a grill frame construction of vertically-spaced bars. The crowding gate 36 is carried by hinges attached to a support post 52 therefor, which is situated up against the edge of the head gate 34.

Aside from the four (4) panels 21-24, the aerial pen/hauler 20 in accordance furthermore includes an abbreviated floor platform 38 which spans the full side-to-side width of the aerial pen/hauler 20 before the rear panel 22. This abbreviated floor platform 38 extends forward to a forward edge that is coterminous with the forward extent of the head gate 34 of the right-side panel 24 and the walk-in gate 32 of the left-side panel 23. This abbreviated floor platform 38 is attached by hinges to a rear bottom rail (eg., 42) for swinging between a latched position flush with the rear panel 22 and a position parallel with the bottom elevation (eg., bottom rails 42) of the aerial pen/hauler 20.

Figure 6:
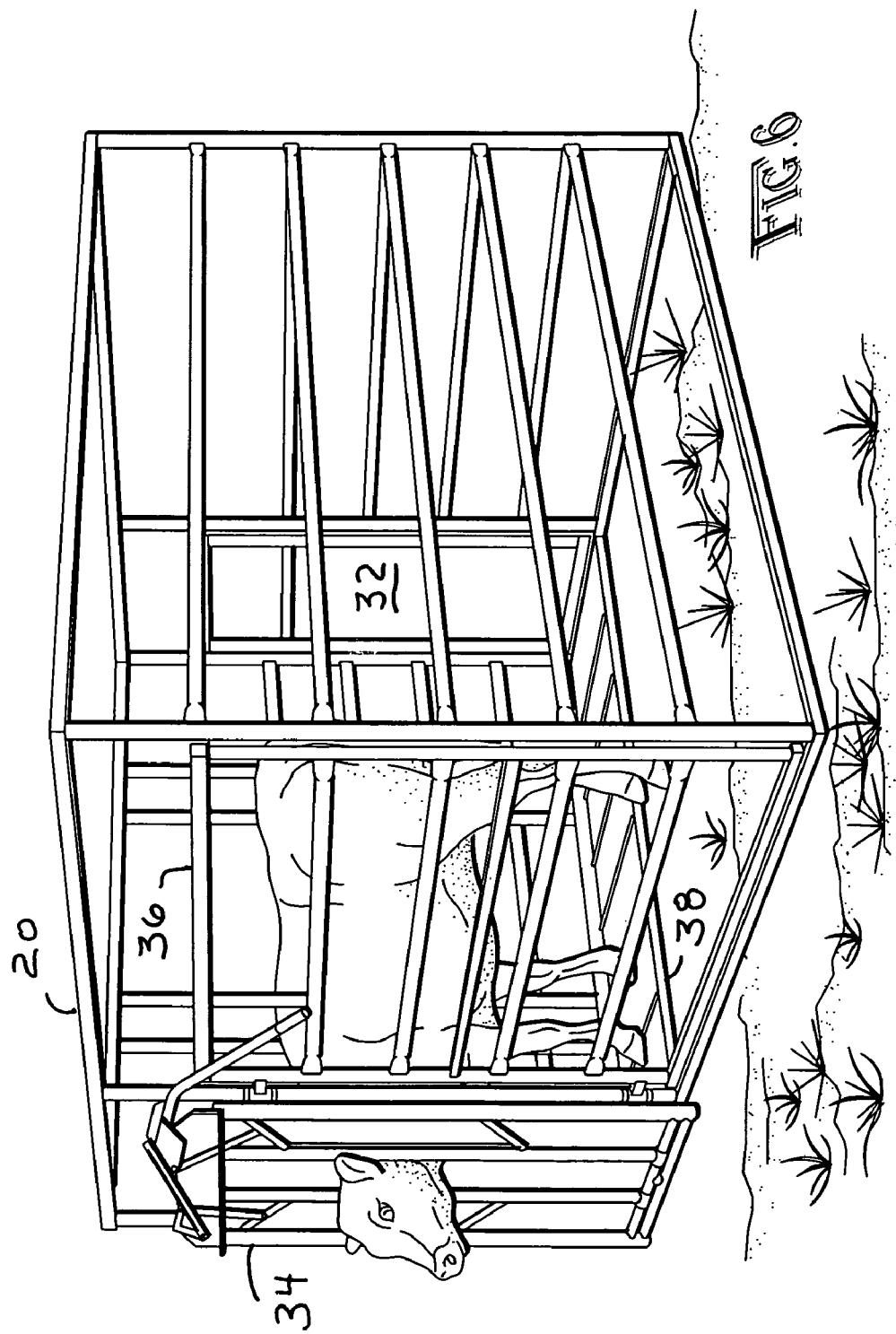
FIG. 6 is a perspective view of the aerial pen/hauler hoisted in FIG. 5 except from a vantage point about a quarter of a turn clockwise in order to better show the head gate, wherein the tractor is removed from view for convenience of illustration sake.

The crowding gate 36 swings between a latching position with the right-front corner post 27 (eg., as shown by FIG. 6 or 9) and a quarter-revolution away latching position with the front edge of the abbreviated floor platform 38 (eg., as shown by FIG. 7).

That is, FIG. 7 shows the crowding gate 36 latched in a "crowding" position, whereas FIG. 6 shows the crowding gate 36 latched in mere "confining" position.

The head gate 34 is operable among various positions as, namely, between an open position (eg., as somewhat shown by FIG. 9) and a neck-collaring position (eg., as shown by FIGS. 6 through 8).

The walk-in gate 32 is bracketed between the left-rear corner post 28 and a frame post 54 which defines its forward extent. In contrast to the crowding gate 36, the walk-in gate 32 is supported by hinges to swing along its front edge (and not along its rear edge as the crowding gate 36). That is, the walk-in gate 32 is supported by hinges attached to the frame post 54 which defines its forward extent.

Thus, walk-in gate 32 swings between a latching position with the left-rear corner post 28 and a quarter-revolution away latching position with the front edge of the abbreviated floor platform 38 (this is not shown by any view). Again, despite that this is not shown in FIG. 10 (nor in any other), the walk-in gate 32 is capable of being swung to a latching position with the front edge of the abbreviated floor platform 38, and therefor meet and make a continuous continuation with the crowding gate 36 along the front edge of the abbreviated floor platform 38.

The rear panel 22 is stiffened (eg., by stiffeners 56) for strength where the front-end loader 18's coupling hardware attaches thereto. That way, the aerial pen/hauler 20 as a unit can be carried aerially in its entirety by the tractor/front-end loader 16 and 18 (and as shown by FIGS. 1-3 and 8), or otherwise be set-down on the ground as shown by FIGS. 4-7 and 9-10.

The aerial pen/hauler 20's four (4) corner posts 26-29 are secured in a fixed arrangement by at least four (4) top rails 44 as well as four (4) bottom rails 42. That way, the aerial pen/hauler 20 can serve independently of and uncoupled away from the front-end loader 18 as a stand-alone cattle chute or alternatively a confining pen (eg., a small-scale corral). Moreover, when coupled to the tractor/front-end loader 16 and 18, the aerial pen/hauler 20 can function as a tip chute, as for veterinary and like reasons.

The construction and arrangement of the aerial pen/hauler 20 as a whole is novel and inventive. Nevertheless, some components thereof (and in particular the head gate 34) are readily available from market sources including without limitation the products of Hawarden, Iowa's For-Most Livestock Equipment, Inc.

The pause to review the apparatus aspects of the invention can be discontinued within this description in favor of renewed attention to the method aspects of the invention.

Again, FIGS. 1 through 8 comprise a sequence of frames showing the carrying-out of a method in accordance with the invention for aerial capture-and-carry of cattle in open terrain by land vehicle.

FIG. 1 shows the aerial pen/hauler 20 hoisted in an aerial transport position on the front-end loader attachment 18 of a moving tractor 16. FIG. 1 also shows the target cow which is under pursuit in the view. The aerial pen/hauler 20 has been prepared for entrapping the cow in at least the following way. The walk-in gate 32 is latched closed in its relative confining position, the crowding gate 36 is likewise latched closed in its respective confining position, and the head gate 34 is closed shut. The abbreviated floor platform 38 is swung up to its latched closed (and up) position in which it rest flush against the rear panel 22. That way, the entire floor plan of the aerial pen/hauler 20 is open.

FIG. 2 shows the tractor 16 drawing nearer to the target cow, with the aerial pen/hauler 20 still held aerially aloft. At this point, the cow makes no real effort to run away. The reasons for this can be manifold. One reason might be, almost all of the herd will be real familiar with the tractor 16 driving among and around them in the open field, many times a week during some seasons. Thus the herd does not normally associate the tractor 16 as a strange thing to run away from. Indeed, it anything, the herd might have positive associations with the tractor 16, such as being the noisy machine with brings out round bales of hay during the winter (ie., food). Another reason might be, the selected cow might be selected precisely because it is ill and is in need of medical attention:—it is too sick to want to desperately runaway. And so on, as these are cows, and seem to be endowed with a natural curiosity and trust.

FIG. 3 shows that the tractor 16 has closed the gap between the target cow, and with the hoisted-aloft aerial pen/hauler 20 disposed right overhead the cow.

FIG. 4 shows the trap set down. Now pause can be taken why it is preferred to customize the hydraulics to operate a little faster than stock from the factory. It is because a practitioner of the method in accordance with the invention (who would also be the driver of the tractor 16) wants the hoisted-aloft aerial pen/hauler 20 to drop down rather quickly out of the sky, like a box trap. If it descends too slow, the cow may be tempted to squeak underneath the descending trap, perhaps escaping capture. In any event, the sequence of FIGS. 1 through 4 show that the pursued cow was apparently oblivious to the pursuit or otherwise was fairly docile-acting during the whole of the pursuit and capture. The reaction of the cow in FIG. 4 might be a dawning realization that it is now confined. FIG. 4 shows, finally, some measure of protest from the cow.

Figure 5:
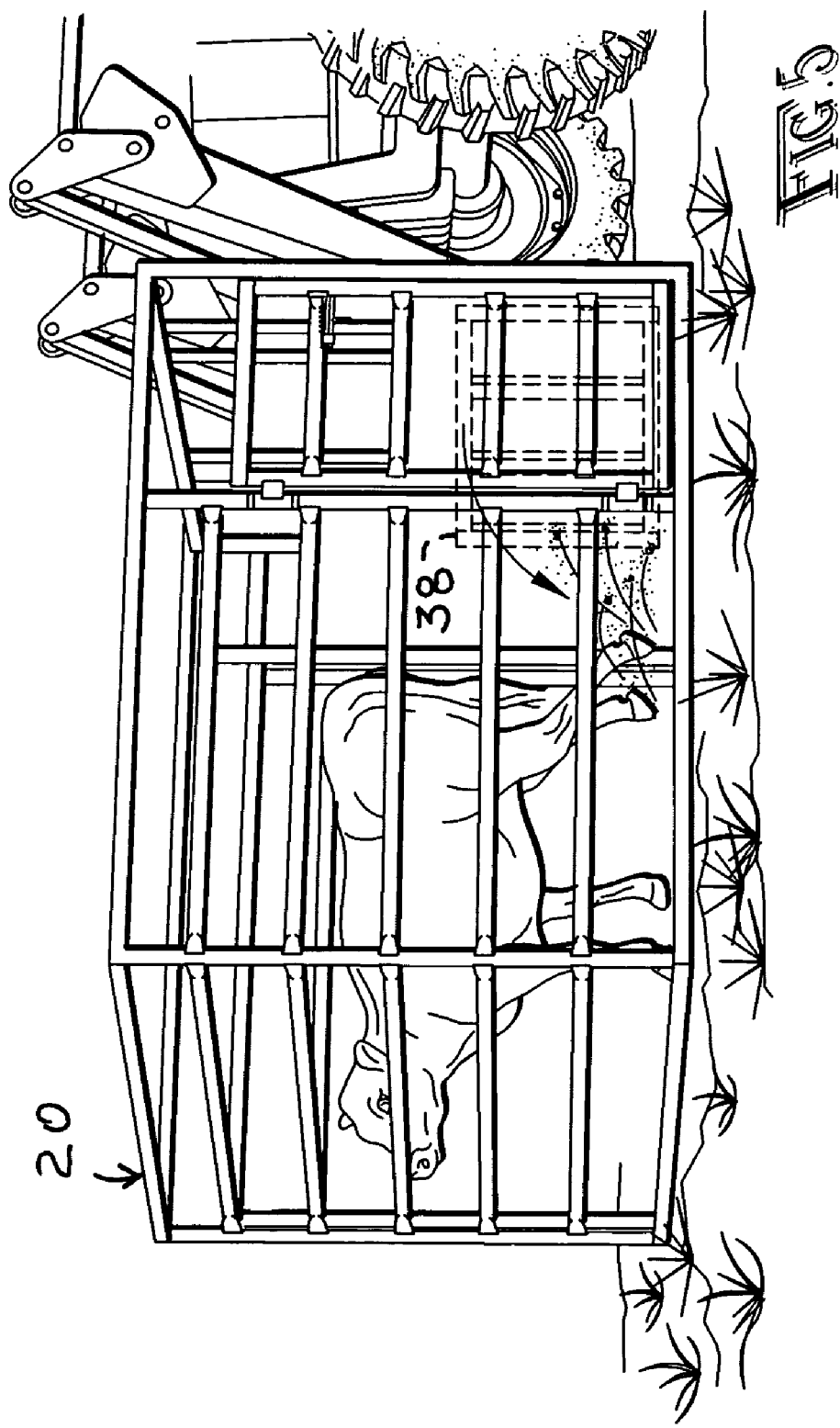
FIG. 5 is an enlarged-scale perspective view, comparable to FIG. 4, except showing the drop of the abbreviated floor platform into its ground plane position.

FIG. 5 shows that, at this point, the practitioner(s) of the method in accordance with the invention should drop the abbreviated floor platform 38 into its ground plane position. It either is latched there or else just allowed to rest upon welded tab seats. Generally, the confined cow will be out of the way as it might naturally tend to shy away from the tractor 16 and hence rear end rather than crowd it. In any event, it is also possible to shove and/or shoo away the cow toward the front two-thirds or so of this confinement pen 20 so that the abbreviated floor platform 38 can be dropped down (as it only correspondingly covers the rear third to quarter of the confinement pen 20's ground plan when dropped down). However, the switch of positions for the abbreviated floor platform 38 is not shown in this view.

It is an aspect of the invention that the method in accordance with the invention can be practiced by a sole worker without assistance. Nevertheless, a sole worker probably cannot sit in the tractor 16 the whole time. Presumably, the worker would have to get off the tractor 16 and lure the cow to stick its head through the head gate 34 by opening the gate 34 with actuating lever 58 thereof, and then closing the head gate 34 on the cow's neck when the cow attempts to rush the gate 34.

FIG. 6 shows, needless to say, freedom denied. The cow's attempt to rush out the gate 34 ended up with the cow collared as shown. The worker would have actuated the lever and pulled the side-by-side shutters of the head gate 34 to a partially-closed position, comprising a neck-collaring position. As mentioned above, head gates are conventional in the prior art, and the one depicted here is produced by the For-Most Livestock Equipment corporation of Hawarden, Iowa. The skill and experience for successfully luring and collaring a cow by a head gate 34—apart from the inventive method hereof with the aerial pen/hauler 20 in accordance with the invention—have been long practiced and honed by many in the livestock trade. However, such is inventively utilized here in the practice of the method as a whole in accordance with the invention.

FIG. 7 shows several things. For one, the confined cow has been collared around its neck by the head gate 34. Two, the cow is fairly unconcerned (eg., not struggling). This is so because cows become accustomed to being collared like this, it nowadays being a common experience for mature livestock to have been collared so numerous times in their lives, with release without harm being the ultimate outcome. Three, the crowding gate 36 has been swung and latched into its crowding position in order to do the following:—to keep the cow crowded to standing upon the abbreviated floor platform 38.

FIG. 8 shows the hoisting of the inventive aerial pen/hauler 20 into an aloft position, with the cow as cargo. Experience has shown that the subject cow will not be unduly stressed by this method of capture and carry. Indeed, experience shows that cows remain pretty calm throughout. Again, FIG. 8 shows that the tractor 16 is driving away with the captured cow held aloft and as secured in the inventive aerial pen/hauler 20 to a destination where its welfare and/or medical needs can be better looked after. Once more, it is worthy to remark that cows will be relatively unperturbed by this experience.

Given the foregoing, the following advantages and aspects of the invention are more readily apparent to practitioners of livestock care.

In the past, a sick cow was often roped in the open field and swarmed over to hold it motionless while a welfare examination was performed. Often times, the roping and swarming caused more stress than the welfare examination caused good.

In contrast, with the inventive aerial pen/hauler 20 in accordance with the invention, the captured livestock can be confined for however long as need be to best serve its welfare interests. The welfare thereof can be attended to in the field as soon as captured or else, better yet, once after hauled back to a barn or closer in site where there are more resources in the way of personnel and facilities for welfare attention. The tractor/front-end loader 16 and 18 can be uncoupled and the captured livestock be left in the confining pen 20 for an indeterminate amount of time with no problems. However, when serving merely as a holding area, it is preferred to release the subject cow from the head gate 34 and swing out the crowding gate 36 to the confining not crowding position so at least the subject cow has the whole floor play of the inventive pen (ie., aerial pen/hauler 20) without being too cramped.

It is another aspect of the invention that the aerially-carried subject as shown in FIG. 8 can be deposited on a flatbed truck or trailer to be sped away to more skilled sites of welfare personnel and facilities.

It is another aspect of the invention that this inventive 'pursue-and-pounce' method of cattle catching (albeit at an unhurried pace to decrease stress and enhance welfare) can be practiced not stationary but on the cruise. Needless to say, the preferred cruise speeds are about the pace of walking gait for livestock. Still, there is no requirement the livestock stand still. The inventive method enables capture of targets on the hoof.

It is a further aspect of the invention that the aerial pen/hauler 20 doubles as a tip chute.

It is an alternate aspect of the invention that, during times of non-use, the aerial pen/hauler 20 serves as a conventional confining pen or enhanced one with a chute (eg., 22, 32, 36 and 38) and head gate 34.

It is still another aspect of the inventive aerial pen/hauler 20 that it is adapted to be manipulated by a tractor 16's front-end loader accessory 18 because of livestock's acceptance of the presence of the tractor 16, which is ingrained by many hours experience around the tractor 16, a lot of which are pleasant associations because of the deposit of food in the way of round hay bales or the like.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of aerial capture-and-carry of livestock in open terrain by land vehicle, said method comprising the steps of:

providing an aerial pen with sidewalls defining an open bottom, a movable platform for a targeted animal to stand or otherwise be carried upon which is movable between a retracted position substantially non-interfering with the open bottom and a carry position, a livestock head gate movable between an open and closed, and a movable crowding panel movable between a retracted position substantially non-interfering with the open bottom and a crowding position; wherein the head gate, platform and crowding gate are cooperatively arranged such when the platform and crowding gate are in the carry and crowding positions respectively, the targeted animal can be secured for aerial carrying;

providing a driven land vehicle with a mechanism to raise up high and lower back down the aerial pen rigid pen;

attaching the aerial pen to the driven land vehicle's mechanism;

driving the vehicle in pursuit of the targeted animal with the aerial pen raised off of the ground with both the platform and crowding gate retracted and the head gate closed;

lowering the pen onto the ground to confine the targeted animal at least within the sidewalls;

moving the platform into the carry position;

opening the head gate to entice the targeted animal to escape and then closing the head gate on the targeted animal's neck for capture, with the targeted animal standing or otherwise supported on the platform; and moving the crowding gate to flank one side of the targeted animal, the other side being flanked by a portion of the aerial pen's sidewalls.

2. The method of claim 1, wherein steps of moving the platform into the carry position, opening and closing the head gate, and moving the crowding gate to flank one side of the targeted animal, are performed by a user on foot who had been driving the vehicle but then exited the vehicle.

3. The method of claim 2, wherein the pen has a personnel gate in a portion of the sidewalls for the user to enter and exit the confines of the pen.

4. The method of claim 1, wherein the pen defines a rear having a coupling device for attachment to the motorized vehicle.

5. The method of claim 1, wherein the motorized vehicle's mechanism comprises a front-end loader mechanism.

6. The method of claim 1, further comprising:
raising the pen, with the targeted animal not only secured by the head gate and crowding panel but also supported on the platform; and
driving the vehicle to a different location.

7. The method of claim 6, further comprising:
arriving at the different location;
lowering the pen back down to the ground;
moving the crowding panel to the retracted position therefor; and
releasing the targeted animal from the head gate to at least be confined within the sidewalls of the aerial pen.

8. The method of claim 1, wherein the movable crowding panel swings about a vertical axis and in the retracted position therefor forms a portions of the pen's confining sidewalls.

9. The method of claim 1, wherein the movable platform swings about a horizontal axis and in the retracted position therefor is flush against the portion of the aerial pen's sidewalls that flanks the targeted animal's other side, in opposition to the crowding gate.

10. The method of claim 9, wherein the step of moving the platform into the carry position, which follows the step of lowering the pen onto the ground to confine the targeted animal at least within the sidewalls, further comprises:
moving the platform into the carry position when the targeted animal is at least out of the way to allow such.

11. The method of claim 10, wherein the step of moving the platform into the carry position when the targeted animal is at least out of the way to allow such further comprises:
inducing the targeted animal to get out of the way.

12. The method of claim 11, wherein step of inducing the targeted animal to get out of the way is performed by a user on foot who had been driving the vehicle but then exited the vehicle.

13. The method of claim 1, wherein the motorized vehicle is a tractor.

14. The method of claim 1, wherein the targeted animal comprises any of cattle, horses, sheep or hogs.

15. An aerial pen/hauler for aerial capture-and-carry of livestock in open terrain by land vehicle in accordance with the method of claim 1.

\* \* \* \* \*